Patented Apr. 29, 1930

1,756,110

UNITED STATES PATENT OFFICE

WILLIAM H. WILLIAMS AND EDGAR C. BRITTON, OF MIDLAND, MICHIGAN, ASSIGNORS TO THE DOW CHEMICAL COMPANY, OF MIDLAND, MICHIGAN, A CORPORATION OF MICHIGAN

MANUFACTURE OF PHENATES

Application filed June 11, 1923. Serial No. 644,642.

The object of the present invention is to make synthetically an alkali metal phenate from a suitable benzene derivative, specifically mono-chloro-benzene, without making phenol as an intermediate product, which phenate may then, if desired, be carbonated in order directly to produce the corresponding alkali metal salicylate. By thus eliminating the use of phenol, the production of phenol as such is made unnecessary, and the journey from benzene to salicylic acid, as measured in process steps, is greatly shortened, plant and operating labor much reduced, and cost of manufacture lowered.

To the accomplishment of the foregoing and related ends the invention, then, consists of the steps hereinafter fully described and particularly pointed out in the claims, the annexed drawings and the following description setting forth but one of the various ways in which the principle of the invention may be used.

In said annexed drawings:—

Figure 1:
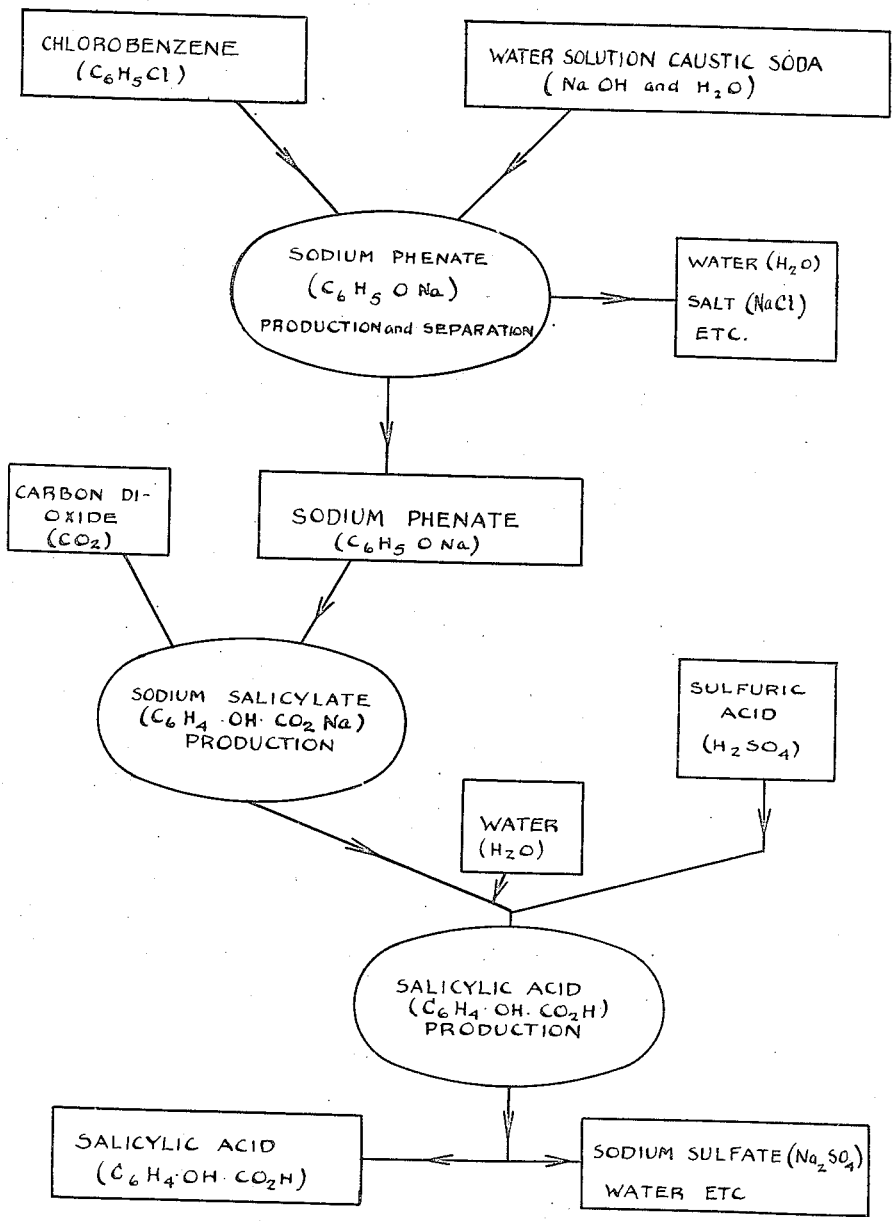
Figure 2:
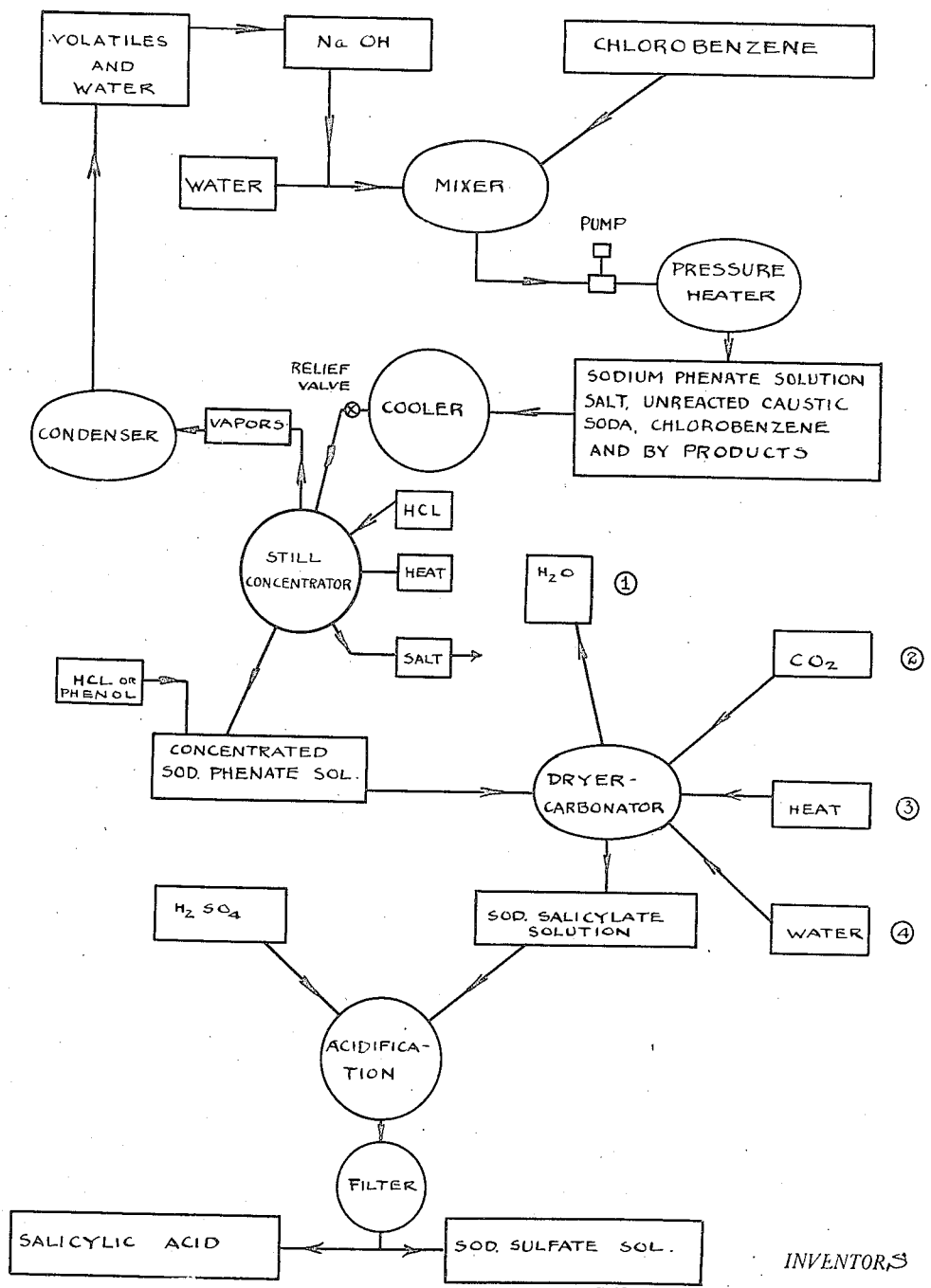

Fig. 1 is a flow sheet illustrating the fundamental steps involved and the principal raw materials used in the process; and Fig. 2 is a similar flow sheet illustrating in more detailed manner certain of the steps shown in Fig. 1.

Briefly stated, the steps in the process comprise, first, the production of an alkali metal phenate, as for example, sodium phenate ($C_6H_5ONa$), by reacting between a mono-halogen substitution product of benzene, specifically, mono-chloro-benzene ($C_6H_5Cl$), and a water solution of an alkali metal hydroxide as, for example, caustic soda (NaOH), said reaction being conducted under conditions of temperature, pressure, strength of solution, and relative quantities of reagents suited to secure satisfactory yields. Thereupon follow steps necessary to separate the resulting phenate from the volatile and other by-products of the main reaction such as any chloro-benzene not reacted upon and di-phenyl oxide. Such phenate with salt (NaCl) will then be left in water solution, containing possibly some excess alkali. This solution is finally concentrated to remove most of the salt and the phenate is dried for use in the carbonation step whereby the corresponding alkali metal salicylate is produced. The excess alkali accompanying the phenate may be neutralized with acid, as, for instance, hydrochloric acid, preferably before concentration of the solution or partly before and partly after, i. e., prior to the final drying of the phenate. In place of hydrochloric acid, phenol may be employed as a neutralizing agent as will be later explained.

The sequence of the foregoing steps will be readily understood upon reference to Fig. 1, which consists of a flow sheet whereon such steps are appropriately designated. For more detailed understanding of the several operations involved, reference may be had to Fig. 2. In explanation of the latter, it should be stated that the chlorobenzene is mixed with water solution of caustic soda to form an emulsion. The specific gravity of such sodium hydroxide solution is made preferably approximately the same as that of the chloro-benzene, because at that gravity the proportion of alkali to water is within the limits we have found best suited to give a high yield in a reasonable time, and such equating of gravities also consists in stabilizing the even distribution of the chloro-benzene by eliminating gravitational tendency to separate and stratify during the reaction period. Such emulsion is then pumped into a pressure vessel, such as an autoclave of suitable construction, in which it is maintained at high temperature until the completion of the desired reaction, producing principally a water solution of sodium phenate and common salt. This solution may be cooled or not, as desired. If not cooled, it will upon liberation of pressure automatically cool to the boiling point at atmospheric pressure, with self-evaporation of water and volatile products.

The temperature and pressure required to carry out the foregoing reaction will vary depending upon the length of time allowed. Without a catalyst using caustic solution as stated with the caustic somewhat in excess of the molecular requirements and operating at from 1200 to 1500 pounds pressure and a temperature approximately 300° C. a good yield of phenate will be obtained in fifteen minutes using brom-benzene, or in one hour using chloro-benzene. With a catalyst and operating with a solution as stated using proportion of two or slightly more molecules of hydroxide to each molecule of chloro-benzene at a temperature approximating 365° C. requiring a pressure in excess of 3000 pounds, a conversion of 95 per cent. of the chloro-benzene may be obtained in half an hour.

The liquid resulting from the reaction, as indicated in Fig. 2, may be discharged from the autoclave into a cooler, altho this is a matter of choice, since, as already indicated, the liquor may be discharged directly with self-evaporation of water and volatile products. Where a cooler is employed the liquor may still not be cooled below the point where such self-evaporation will follow or it may be cooled below this point.

In order to obtain the sodium phenate formed by the reaction in the autoclave, the liquor after being discharged from the latter is concentrated by evaporation, and if desired unreacted chloro-benzene and volatile by-products may be recovered from that portion of the vapor thus driven off which contains these products. The salt (NaCl) that separates out during the concentration is removed and any phenate adhering to it is washed back into the mother liquor. We have found it possible to thus eliminate approximately 95 per cent. of the salt content originally present, this stage being reached when the solution is concentrated until it contains 50 per cent. of the phenate by weight. We have found it possible to obtain in this manner a strong solution of phenate sufficiently free from salt and other impurities to permit its efficient use, without further purification, in making salicylic acid. Excess alkali, if any, may be neutralized by an acid HCl, $H_2SO_4$, etc., or may be converted to phenate by the addition of phenol to the weak solution before concentration or to the strong solution after concentration. This use of phenol would be in small amount relative to the equivalent phenol in the product obtained as a result of the main reaction, its use being rather as a reagent for the purpose indicated than as an ingredient for the production of phenate. We have observed a slight evolution of phenol during hot concentration of the phenate salt solution, said phenol accompanying the water vapor given off. Such liberated phenol may be readily conserved in various ways, preferably by condensing the water vapor containing the phenol and using such condensate for making up the alkali solution for the main phenate reaction, whereby the traces of phenol thus evolved are fixed as phenate; or the said phenol containing vapors may be brought into contact with alkali or alkaline liquors directly and the same result attained.

The next step, namely, the drying of the concentrated sodium phenate solution, is accomplished in a closed container, preferably operated under vacuum and with agitation whereby the phenate is obtained in dry powdered condition. The source of vacuum is then shut off and carbon dioxide gas under pressure is admitted to the same container without removing the phenate therefrom and the conversion of such phenate into sodium salicylate effected in the usual manner. Water is thereupon admitted, agitation continued, as a result of which a water solution of the salicylate is made and the solution is then discharged and acidified, as with sulfuric acid, there being produced a soluble sodium sulfate, from which solution the sparingly soluble salicylic acid precipitates out. The sulfate solution is then decanted, the precipitate washed on a filter or in a centrifuge and further purified by various methods as, for example, by sublimation after drying.

The phenol ordinarily available for use in the manufacture of salicylic acid is synthetic, and requires a very elaborate, costly and complicated plant for its production. In its preparation in such a plant an alkali metal phenate mixed with other products is produced as an intermediate product. This crude phenate mixture is acidified and the phenol liberated. The so liberated crude phenol is in part decanted, in part distilled from weak water solution. It must be finally purified by distillation in vacuum, such purified phenol is suitable for making salicylic acid but since it must be reconverted into alkali metal phenate, such reconversion constitutes a step in retrogression, requiring a second equivalent of alkali.

From the foregoing description of our improved process, it will be evident that the sodium phenate which we use in the production of salicylic acid is obtained directly from the benzene derivative and original alkali that constitute the original raw materials, without converting such phenate into phenol as an intermediate step. As compared with the manufacture of salicylic acid using synthetic phenol as the starting point, the amount of caustic required to reconvert such phenol into phenate is saved, as well as the amount of acid required in the formation of such phenol. We are aware that it has been proposed to thus use the crude mixture resulting from the alkali fusion of alkali metal benzene sulfonate in the sulfonation phenol process, but such crude phenate contains sulphite and is otherwise totally unsuited to practical use in that way. Starting, however, with chloro-benzene, a common commodity of commerce obtainable in quantity, the method herein employed gives, with but few process steps, a purified phenate suited to use in making salicylic acid. It shortens the route very materially from benzene to salicylic acid, it eliminates many steps, much plant, labor and fuel; it further requires alkali but once and that with good efficiency. At the same time, by devising a novel method for the purification of our phenate, whereby not only are the volatile by-products eliminated, but also the salt formed in the main reaction is separated out, a substantially pure phenate is obtained that is in every way suited for the production of a high grade of salicylic acid.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a process of the character described, the steps which consist in reacting between monochlorobenzene and sodium hydroxide sodium, whereby a solution containing sodium phenate and sodium chloride is produced; and separating out sodium chloride, leaving a concentrated water solution of sodium phenate.

2. In a process of the character described, the steps which consist in reacting between monochlorobenzene and sodium hydroxide solution, whereby a solution containing sodium phenate and sodium chloride is produced, separating unreacted chlorobenzene and any volatile by-product, water, and sodium chloride therefrom, whereby a concentrated water solution of sodium phenate remains, and neutralizing any excess alkali by adding phenol.

3. In a process of the character described, the steps which consist in reacting upon monochlorobenzene with a water solution of alkali-metal hydroxide, then separating other substances both fluid and solid from the resulting water solution of alkali-metal phenate, and neutralizing free alkali by combining therewith any phenol driven off during the aforesaid separation.

Signed by us this 7 day of June, 1923.

WILLIAM H. WILLIAMS.
EDGAR C. BRITTON.

CERTIFICATE OF CORRECTION.

Patent No. 1,756,110.   Granted April 29, 1930, to

WILLIAM H. WILLIAMS ET AL.

It is hereby certified that error appears in the printed specification of the above numbered patent requiring correction as follows: Page 1, line 78, for the word "consists" read "assists"; page 3, lines 24 and 25, claim 1, for "sodium" read "solution"; and that the said Letters Patent should be read with these corrections therein that the same may conform to the record of the case in the Patent Office.

Signed and sealed this 22nd day of July, A. D. 1930.

(Seal)

Wm. A. Kinnan,
Acting Commissioner of Patents.